United States Patent [19]
Lee et al.

[11] Patent Number: 5,693,426
[45] Date of Patent: Dec. 2, 1997

[54] MAGNETIC RECORDING MEDIUM WITH B2 STRUCTURED UNDERLAYER AND A COBALT-BASED MAGNETIC LAYER

[75] Inventors: Li-Lien Lee; David N. Lambeth; David E. Laughlin, all of Pittsburgh, Pa.

[73] Assignee: Carnegie Mellon University, Pittsburgh, Pa.

[21] Appl. No.: 315,096

[22] Filed: Sep. 29, 1994

[51] Int. Cl.$^6$ .................... G11B 5/64; G11B 5/66
[52] U.S. Cl. ............... 428/611; 428/65.3; 428/336; 428/668; 428/673; 428/674; 428/694 TS; 428/694 TP; 428/694 TM; 428/900; 360/97.01; 427/131; 427/132; 204/192.15; 204/192.2
[58] Field of Search ............... 428/65.3, 336, 428/611, 668, 673, 674, 694 TS, 694 TP, 900, 694 TM; 360/97.01; 427/131, 132; 204/192.15, 192.2

[56] References Cited

U.S. PATENT DOCUMENTS

| | | | |
|---|---|---|---|
| 3,615,911 | 10/1971 | Nesbitt et al. | 148/31.57 |
| 4,287,225 | 9/1981 | Kneller et al. | 427/48 |
| 4,560,624 | 12/1985 | Guttner et al. | 428/632 |
| 4,642,145 | 2/1987 | Masumoto et al. | 148/336 |
| 4,652,499 | 3/1987 | Howard | 428/641 |
| 4,735,840 | 4/1988 | Hedgcoth | 428/65 |
| 4,820,584 | 4/1989 | Morita et al. | 428/336 |
| 4,868,070 | 9/1989 | Nagao et al. | 428/626 |
| 4,883,711 | 11/1989 | Shiroishi et al. | 428/336 |
| 4,902,583 | 2/1990 | Brucker et al. | 428/665 |
| 5,057,200 | 10/1991 | Lal et al. | 204/192.15 |
| 5,118,564 | 6/1992 | Shinohara et al. | 428/336 |
| 5,147,732 | 9/1992 | Shiroishi et al. | 428/668 |
| 5,192,626 | 3/1993 | Sekiya et al. | 428/694 |
| 5,344,706 | 9/1994 | Lambeth et al. | 428/336 |
| 5,403,547 | 4/1995 | Smith et al. | 420/581 |
| 5,463,578 | 10/1995 | Gambino et al. | 365/122 |

FOREIGN PATENT DOCUMENTS 02148411  6/1990  Japan .

OTHER PUBLICATIONS

David E. Laughlin and Bunsen Y. Wong, The Crystallography and Texture of Co–Based Thin Film Deposited on Cr Underlayers, Nov. 1991, IEEE Transaction on Magnetics, vol. 27, No. 6, pp. 4713–1717.

T. Yamashita, L.H. Chan, T. Fujiwara and Tu Chen, Sputtered $Ni_xP$ Underlayer for CoPt–Based Thin Film Magnetic Media, Nov. 1991, IEEE Transaction on Magnetics, vol. 27, No. 6, pp. 4727–4729.

K. Hono, B. Wong, and D.E. Laughlin, Crystallography of Co/Cr Bilayer Magnetic Thin Films, Nov. 1, 1990, J. Appl. Phys. 68 (9), 1990 American Institute of Physics, pp. 4734–4740.

N. Tani, M. Hashimoto, Y. Murata, M. Ishikawa, Y. Ota, and K. Nakamura, Effects of Substituted Elements Into the Cr Layer on a CoNiCr/Cr Sputtered Hard Disk, Jun. 15, 1990, J. Appl. Phys. 67 (12), 1990 American Institute of Physics, pp. 7507–7509.

Rajiv Ranjan, Beta Tungsten Underlayer for Low–noise Thin–film Longitudinal Media, May 1, 1990, J. Appl. Phys. 67, (9), 1990 American Institute of Physics, pp. 4698–4700.

T. Kogure and S. Katayama, High–Coercivity Magnetic Hard Disks Using Glass Substrates, May 1, 1990, J. Appl. Phys. 67 (9), 1990 American Institute of Physics, pp. 4701–4703.

Jack H. Judy, Thin Film Recording Media, Mar. 1990, MRS Bulletin, pp. 63–72.

(List continued on next page.)

*Primary Examiner*—Stevan A. Resan
*Attorney, Agent, or Firm*—Kirkpatrick & Lockhart LLP

[57] ABSTRACT

The present invention provides a longitudinal magnetic recording media having a substrate, a Co or Co alloy based layer and an underlayer disposed between the substrate and the magnetic layer comprised of a material having a B2 ordered crystalline structure, preferably NiAl or FeAl. A thin Cr intermediate layer of about 1.0 nm to 5.0 nm thick may be positioned between the underlayer and the magnetic layer.

30 Claims, 12 Drawing Sheets

Cr, BCC
a=.2884

NiAl, B2
a=.2887

OTHER PUBLICATIONS

B.R. Natarajan and E.S. Murdock, Magnetic and Recording Properties of Sputtered Co–P/Cr Thin Film Media, Nov. 1988, IEEE Transactions of Magnetics, vol. 24, No. 6, pp. 2724–2726.

J.A. Christner, R. Ranjan, R.L. Peterson, and J.I. Lee, Low–Noise Metal Medium for High–Density Longitudinal Recording, Apr. 15, 1988, J. Appl. Phys. 63 (8), 1988 American Institute of Physics, pp. 3260–3262.

Nathan R. Belk, Peter K. George, and Greg S. Mowry, Measurement of the Intrinsic Signal–To–Noise Ratio for High–Performance Rigid Recording Media, Jan. 15, 1986, J. Appl. Phys. 59 (2), 1986 American Institute of Physics, pp. 557–563.

J.K. Howard, Thin Films for Magnetic Recording Technology: A Review, Critical Review, Jan./Feb. 1986, J. Vac. Sci. Technol. A, vol. 4 No. 1, pp. 1–13.

Jacques Daval and Denis Randet, Electron Microscopy on High–Coercive–Force Co–Cr Composite Films, Dec. 1970, IEEE Transactions of Magnetics, vol. Mag.–6, No. 4, pp. 768–207.

E. Y. Chuang and W. Tang, Elimination of CFC in Thin–Film Disk Manufacturing, Third Quarter 1991, Access Selected Topics in Storage Technology, IBM San Jose, vol. V, No. 3, pp. 1–12.

NiAl, B2
a=.2887

FIG. 2(b)

Cr, BCC
a=.2884

FIG. 3(a)   NiAl

MAGNETIC RECORDING MEDIUM WITH B2 STRUCTURED UNDERLAYER AND A COBALT-BASED MAGNETIC LAYER

This work was supported in part under a National Science Foundation grant, No. ECD-8907068. The government has certain rights in this invention.

BACKGROUND OF THE INVENTION

1. Field of the Invention

The present invention relates to thin films for longitudinal magnetic recording media, and more particularly, to B2-structured underlayers for use with a cobalt or cobalt alloy based magnetic layer.

2. Invention Background

There is an ever increasing demand for magnetic recording media with higher storage capacity, lower noise and lower costs. Recording densities in computers have increased steadily over the last two decades. A typical thin film disk has a multilayer structure including a substrate at the base covered by an underlayer, a magnetic layer and may be covered by an overlayer at the top. The overlayer may be coated with an overcoat and an organic lubricant. The magnetic layer is the main body on which the magnetic bits are recorded. Longitudinal recording media comprised of cobalt or cobalt alloy-based magnetic films having a chromium or chromium alloy-based underlayer deposited on a nonmagnetic substrate have become the industry standard.

Important magnetic properties, such as coercivity (Hc), remanent magnetization (Mr) and coercive squareness (S*), which are crucial to the recording performance of the Co alloy thin film for a fixed composition, depend primarily on its microstructure. For thin film longitudinal magnetic recording media, the desired crystalline structure of the Co and Co alloys is hexagonal close packed (HCP) with uniaxial crystalline anisotropy and a magnetization easy direction along the c-axis is in the plane of the film. The better the in-plane c-axis crystallographic texture, the more suitable is the Co alloy thin film for use for longitudinal recording. This is required to achieve a high remanence. For very small grain sizes coercivity increases with increased grain size. Large grains, however, results in greater noise. There is a need to achieve high coercivities without the increase in noise associated with large grains. To achieve a low noise magnetic medium, the Co alloy thin film should have uniform small grains with grain boundaries which can magnetically isolate neighboring grains. This kind of microstructure and crystallographic texture is normally achieved by manipulating the deposition process, by grooving the substrate surface, or most often by the proper use of an underlayer.

Underlayers can strongly influence the crystallographic orientation, the grain size and chemical segregation at the Co alloy grain boundaries. Underlayers which have been reported in the literature include Cr, Cr with an additional alloy element X (X=C, Mg, Al, Si, Ti, V, Co, Ni, Cu, Zr, Nb, Mo, La, Ce, Nd, Gd, Tb, Dy, Er, Ta, and W), Ti, W, Mo, and NiP. While there would appear to be a number of underlayer materials available, in practice, only a very few work well enough to meet the demands of the industry. Among them, the most often used and the most successful underlayer is pure Cr. For high density recording, in plane orientation has heretofore been achieved by grain-to-grain epitaxial growth of the HCP Co alloy thin film on a body centered cubic (BCC) Cr underlayer. The polycrystalline Co-based alloy thin film is deposited with its c-axis, the [0002] axis, either parallel to the film plane or with a large component of the c-axis in the film plane. It has been shown by K. Hono, B. Wong, and D. E. Laughlin, "Crystallography of Co/Cr bilayer magnetic thin films", Journal of Applied Physics 68 (9) p. 4734 (1990), that BCC Cr underlayers promote grain-to-grain epitaxial growth of HCP Co alloy thin films deposited on these underlayers. The heteroepitaxial relationships between Cr and Co which bring the $[0002]_{Co}$ axis down or close to the film plane are $(002)_{Cr}//(11\bar{2}0)_{Co}$, $(110)_{Cr}//(10\bar{1}1)_{Co}$, $(110)_{Cr}//(10\bar{1}0)_{Co}$, and $(112)_{Cr}//(10\bar{1}0)_{Co}$. Different Co/Cr epitaxial relationships prevail for different deposition processes. The Cr underlayer must be thicker than about 100 Å to promote the formation of the structure. U.S. Pat. No. 4,652,499 discloses efforts to improve the underlayer by adding vanadium (V) to Cr to change its lattice constant and thereby to promote a better lattice matching between the HCP Co alloys, CoPt or CoPtCr, and the BCC CrV underlayer.

The need for lighter, smaller and better performing computers with greater storage density demands higher density hard disk media. It is an object of the present invention to those demands with a longitudinal magnetic recording media having high coercivity and low noise. It is a further object of the present invention to meet those demands with a novel underlayer for the magnetic layer.

SUMMARY OF THE INVENTION

The object of the invention is satisfied by a magnetic recording medium comprising a substrate, a magnetic layer, preferably formed from Co or Co alloy film, and an underlayer comprised of a material having a B2-ordered crystalline structure disposed between the substrate and the magnetic layer. B2 phases selected from the group consisting of NiAl, AlCo, FeAl, FeTi, CoFe, CoTi, CoHf, CoZr, NiTi, CuBe, CuZn, AlMn, AlRe, AgMg, and $Al_2FeMn_2$ are considered good candidates, and the B2 phase is most preferably NiAl. The underlayer may be formed in multiple layers wherein each layer is a different one of the foregoing materials. The Co or Co alloy magnetic layer has a hexagonal close packed structure deposited with its magnetic easy axis substantially parallel to plane of the magnetic layer.

The recording medium may also include a chromium intermediate layer interposed between the magnetic layer and the underlayer. The intermediate layer is relatively thin, preferably between about 25 to 50 Å. Thinner layers can provide some improvement provided the layer is thick enough to form a substantially continuous layer on the surface of the underlayer.

The magnetic layer may be covered by an overlayer which in turn may be covered by an overcoat. An organic lubricant is preferably added over the overcoat.

In an alternative arrangement, there may be a first magnetic layer and a second magnetic layer with one or more interlayers disposed between the two magnetic layers. The interlayer is typically Cr, of about 10 to 40 Å. The second magnetic layer may be covered by the overlayer/overcoat/lubricant layers described above.

Materials with the B2 structure are ordered structural derivatives of the body centered cubic (BCC) structure, which is structure of Cr. NiAl, for example, is a Hume-Rothery β-phase electron compound with a valence electron/atom ratio of 3/2 which gives a B2 crystal structure, shown in FIG. 2(b). NiAl has a lattice constant of 0.2887 nm, almost identical to that of Cr, 0.2884 nm. By placing the B2-ordered structure on the substrate, below the magnetic layer, the Co or Co alloy films, when deposited, either directly or through an intermediate Cr layer, grow epitaxially at the B2 interface and reorient the hcp c-axis away from being normal to the film plane, yielding a stable, improved thin film microstructure with magnetic properties which are particularly well suited to high density recording. NiAl, for example, maintains its B2 structure stable up to the melting point of 1911K and the structure does not change over a wide composition range from 41.5 to 55 at % Al at 673K. Strong bonding between the metallic atoms slows the atomic mobility during the film's deposition thereby yielding a smaller grain size film than is present with the Cr underlayer. A small grain size can benefit the recording properties of the media by increasing the number of grains per unit area and hence, lowering the media noise.

In addition, NiAl is nonmagnetic with an extremely low magnetic susceptibility, on the order of $2 \times 10^{-7}$ to $5 \times 10^{-7}$ emu/g, has good thermal conductivity, high stiffness, and good environmental corrosion resistance.

BRIEF DESCRIPTION OF THE DRAWINGS

The advantages of the present invention can be better understood by reference to the drawings in which.

DETAILED DESCRIPTION OF THE PREFERRED EMBODIMENT

Figure 1A:
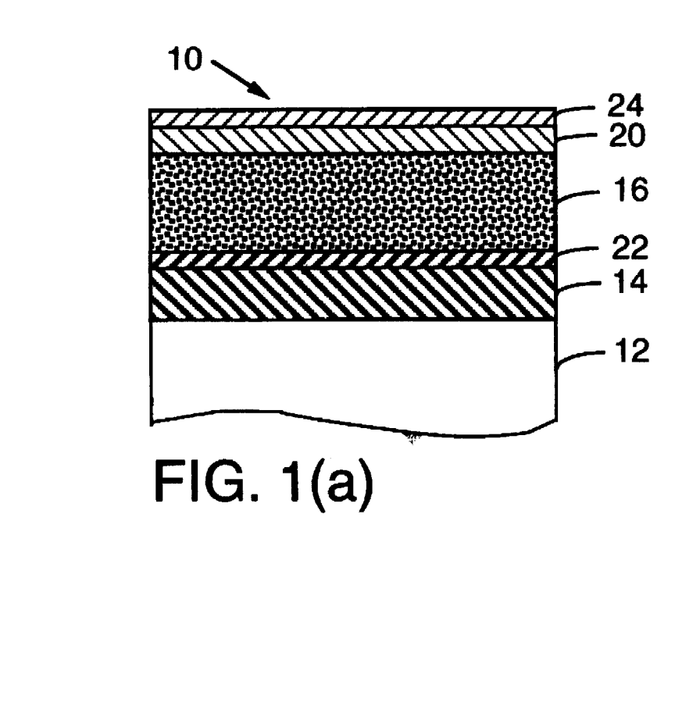
FIGS. 1(a) and (b) are schematic illustrations of embodiments of a multilayer structure of the thin film disk of the present invention.

Referring to FIG. 1(a), the preferred embodiment of the magnetic recording medium 10 of the present invention is comprised of a substrate 12, an underlayer 14 and a magnetic layer 16. In addition, there maybe an overcoat 20, as shown. An intermediate layer 22 of Cr may be disposed between the underlayer 14 and the magnetic layer 16. An organic lubricant 24 is preferably applied to the overcoat 20.

Figure 1B:
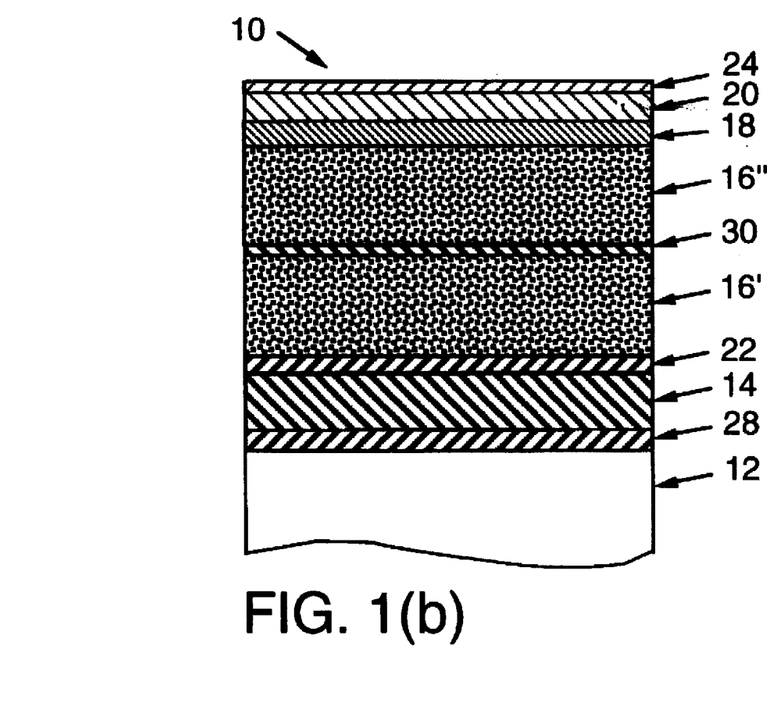

In an alternative arrangement, shown in FIG. 1(b), there may be first and second magnetic layers, 16' and 16", and one or more interlayers 30 disposed between the first magnetic layer 16' and a second magnetic layer 16". The interlayer 30 is preferably made of Cr and is about 1 nm–4 nm (10 to 40 Å) thick. The second magnetic layer 16" is covered by an overlayer 18, the overcoat 20, and the organic lubricant 24 shown in FIG. 1(a). A seed layer 28 about 1.5 nm (15 Å) thick may be disposed between the substrate 12 and the underlayer 14 to nucleate growth.

In the preferred embodiment, the substrate 12 is formed of glass, silicon or an aluminum alloy coated with NiP. Alternative hard disk substrates such as canasite, or SiC may be used.

The magnetic layers 16, 16' and 16", are deposited with the longitudinal magnetic easy axis thereof substantially parallel to the plane of such magnetic layer, are preferably a Co or Co alloy film, such as CoCr, SmCo, CoP, CoPt, CoNiCr, CoNiPt, CoCrTaSi, CoCrPtSi, CoCrPtB, CoCrPtTa, or other known Co alloy magnetic films and are each about 10–60 nm (100–600 Å) thick.

Figure 2A:
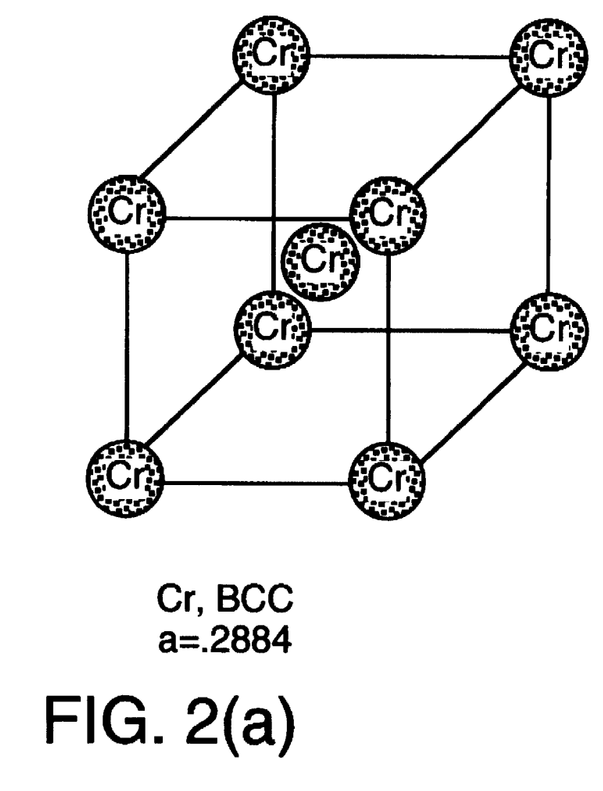
FIGS. 2(a) and (b) depict the crystal structures of Cr (BCC) and NiAl (B2), respectively.
Figure 2B:
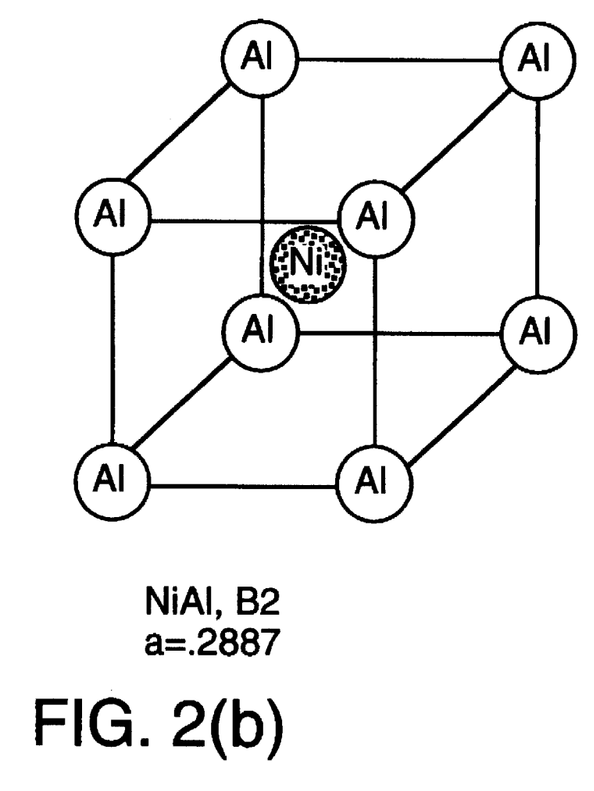

The B2 ordered crystalline structure of the underlayer 14 is shown in FIG. 2(b). The underlayer 14 is most preferably NiAl. It is about 10–200 nm (100–2000 Å) thick. Alternatively, the underlayer may be FeAl, or multiple layers, alternating between a NiAl layer and a FeAl layer. Other phases having a B2-ordered structure and lattice constants close to that of NiAl (a=0.2887 nm), FeAl (a=0.291 nm) and Cr (a=0.2884 nm) are also considered to be good candidates, for the underlayer of the present invention. The materials are AlCo (a=0.286 nm), FeTi (a=0.298), CoFe (a=0.285 nm), CoTi (a=0.299 nm), CoHf (a=0.316 nm), CoZr (a=0.319 nm), NiTi (a=0.301 nm), CuBe (a=0.270 nm), CuZn (a=0.295 nm), AlMn (a=0.297 nm), AlRe (a=0.288 nm), AgMg (a=0.328 nm), and $Al_2FeMn_2$ (a=0.296 nm). It is anticipated that an underlayer comprised of two or more layers of different materials within the foregoing list may be used. For example, it is believed that a multiple layer having a first layer of NiAl and a second layer of FeAl, AlCo, FeTi, CoFe, CoTi, CoHf, CoZr, NiTi, CuBe, CuZn, AlMn, AlRe, AgMg or $Al_2FeMn_2$ may be used. Various combinations of multiple layers wherein each layer is one of the B2 ordered crystalline phases may be employed as the underlayer of the present invention.

An overlayer 18, which is thought to prevent corrosion, may be provided adjacent to and preferably in contact with the magnetic layer 16 or 16". The overlayer 18 is 1–10 nm (10–100 Å) thick and may be made of W, Ta, Zr, Ti, Y, Pt, Cr or any combination thereof.

An overcoat 20 may be provided external to the overlayer 18, so that the overlayer 18 is positioned between the magnetic layer 16 or 16" and the overcoat 20, as shown in FIGS. 1(a) and (b). The overcoat provides a mechanical wear layer and is 2.5–30 nm (25–300 Å) thick. It is preferably made of a ceramic material or diamond like carbon, such as $SiO_2$, SiC, CN or $ZrO_2$. An organic lubricant 24 may be disposed on the overcoat 20. The lubricant is 1–30 nm (10–300 Å) thick and is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

To compare the in-plane magnetic properties of the magnetic recording medium of the present invention, CoCrTa and CoCrPt films were sputter-deposited onto Cr or NiAl underlayers on glass substrates by techniques well known to those skilled in the art. Vibrating sample magnetometry (VSM) was used to measure the magnetic properties. In all the following experimental examples described herein RF diode sputtering was used for film deposition onto smooth glass substrates which were not mechanically textured.

Figure 3A:
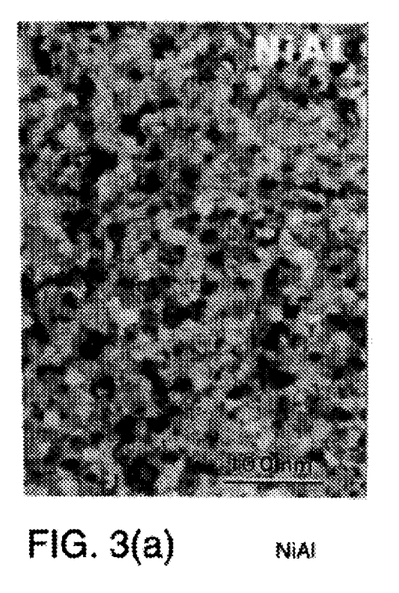
FIGS. 3(a) and (b) show the bright field TEM micrographs of a 100 nm NiAl film (a) and a 100 nm Cr film (b)
Figure 3B:
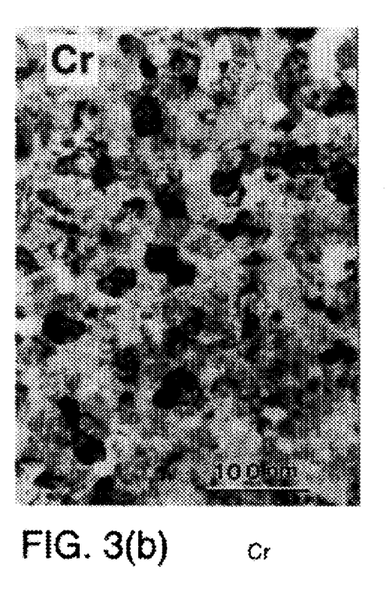

A 100 nm NiAl film was deposited onto a glass substrate. Its microstructure, as observed by transmission electron microscopy (TEM), is compared with a similarly deposited Cr film shown in FIGS. 3a and 3b. The NiAl film, FIG. 3a shows a grain size of about 15 nm which is noticeably smaller (about 50%) than the grain size of the similarly sputter deposited Cr film, FIG. 3b. The grain size of the underlayer strongly influences the grain size of the Co based magnetic layer. It is believed that the strong atomic bonding within the two atom structure of NiAl inhibits the mobility of the Ni and Al atoms and so limits the growth of the grains. The small, well faceted grains of NiAl promote the formation of smaller, more well defined grains in the magnetic layer. Smaller grains reduce noise in the recording media.

Figure 4A:
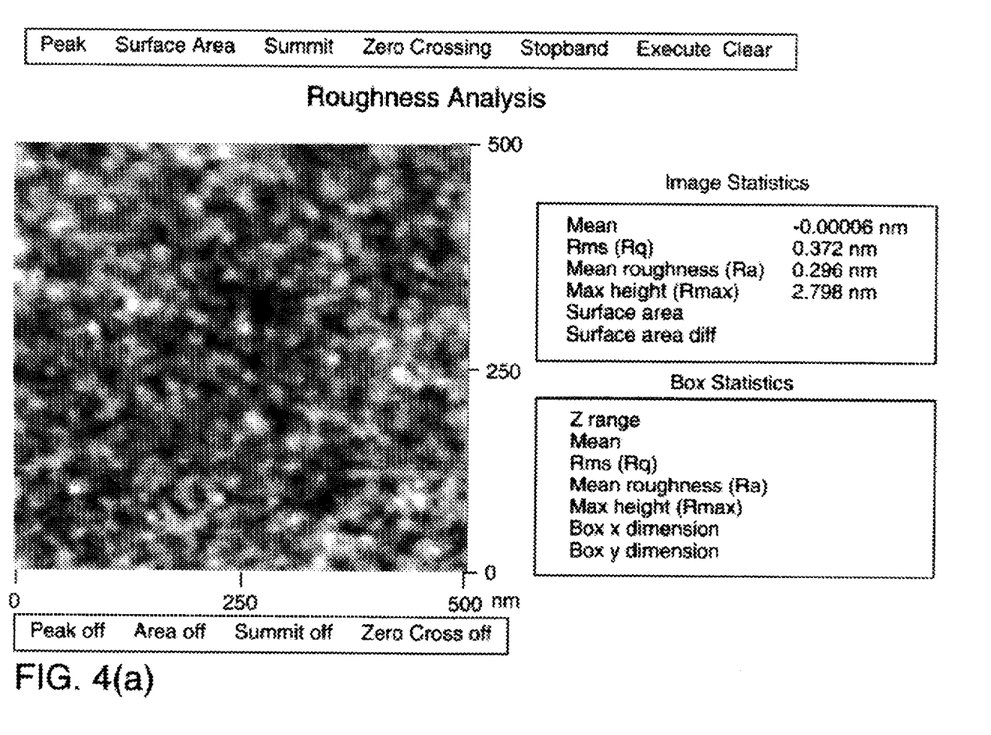
FIGS. 4(a) and (b) show atomic force microscope (AFM) views of a NiAl film (a) and a Cr film (b)
Figure 4B:
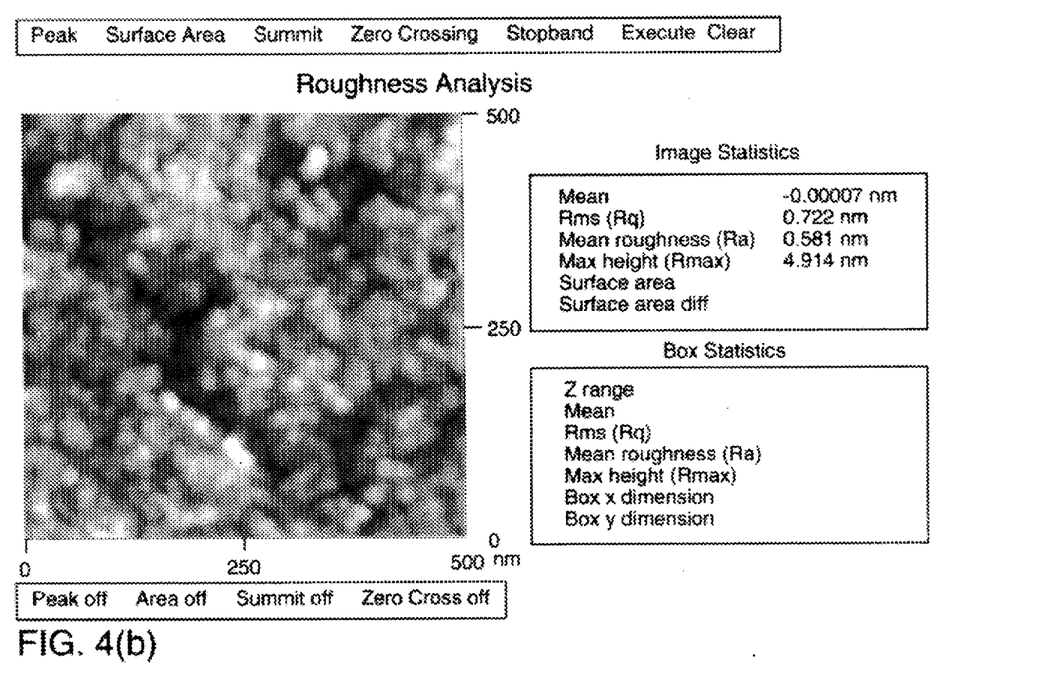

A roughness analysis was done also using an atomic force microscope (AFM). The AFM uses an extremely small sharp tip to scan the sample surface and measures the atomic attraction between the sharp tip and the surface of the sample. The AFM can thereby determine on a very small scale the topology of the sample surface. The white and dark areas of FIGS. 4(a) and (b) represent height differences of the NiAl and Cr underlayer films, respectively, of 100 nm thickness. The images clearly show that the grains (diameter of bumps) of the NiAl films, FIG. 4(a) are much smaller and more uniform than are the Cr grains, FIG. 4(b). Small and uniform grains implies lower noise if everything else about the media is equal. The roughness is a measure of the vertical height variations as one scans over the sample surface. The root mean square (RMS) and mean (average) roughness (Ra) are two different ways of calculating the roughness from the same data. While the maximum height (Rmax) can be misleading if there is a bad spot on the sample, it is a good indication of the extremes (lack of uniformity) of the roughness if the sample is good. The roughness difference between the NiAl and the Cr is another indication of the larger variation in the Cr grain size. The image statistics for the NiAl film show an RMS roughness of 0.372 nm, a mean roughness (Ra) of 0.296 nm and a maximum height (Rmax) of 2.798 nm. The Cr film shows RMS roughness of 0.722 nm, a mean roughness (Ra) of 0.581 nm and a maximum height (Rmax) of 4.914 nm. Clearly, the Cr underlayer has both larger grains and is considerably rougher than the NiAl film.

Figure 5:
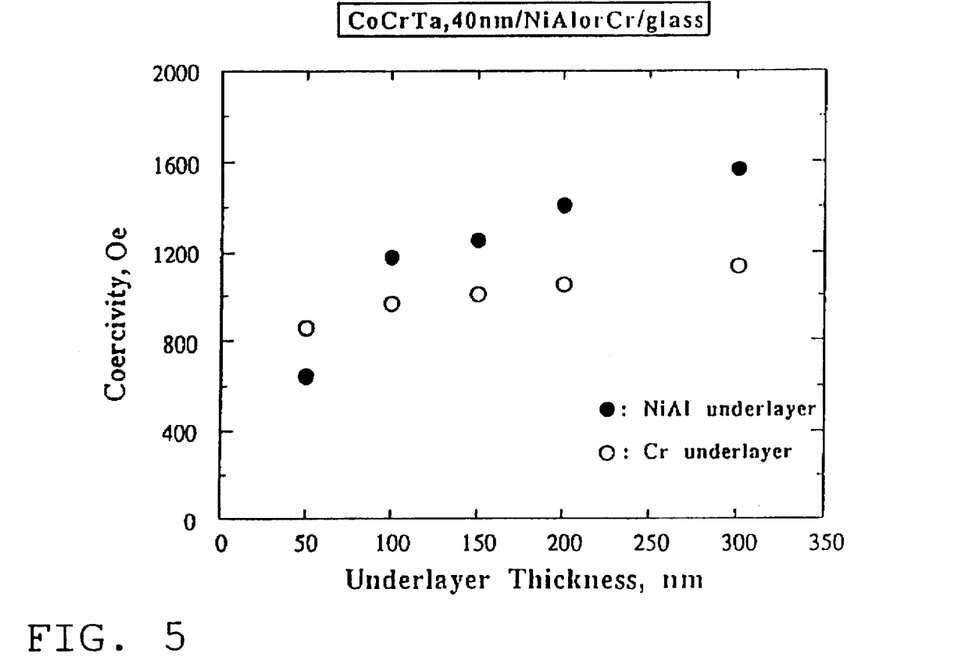
FIG. 5 is a plot of coercivity vs. underlayer thickness of a 40 nm thick CoCrTa film sputter deposited without substrate bias on either NiAl or Cr underlayers.

As shown in FIG. 5, 40 nm thick CoCrTa films were deposited onto NiAl and Cr underlayers of various thickness on glass substrates. The in-plane coercivities of the magnetic films were plotted as a function of the underlayer thickness. When the underlayer is greater than 100 nm thick, the CoCrTa/NiAl films have a higher coercivity, Hc, than the CoCrTa/Cr films for comparable thicknesses. In both cases, the coercivity increases and then reaches a plateau as the underlayer thickens. The steady increase is indicative of larger grains. As indicated previously, larger grains also cause increased noise. With a Cr underlayer, the increased grain size causes a much rougher surface which interferes with the ability of the magnetic head, or transducer, to get close to and read the disk. In practice, due to increased manufacturing costs, the underlayer is not made any thicker than it has to be to get the desired improvement in coercivity. At thicknesses about equal to and greater than 100 nm, the recording medium having the NiAl underlayer offers greater coercivity at thicknesses equal to or even slightly less than those of a recording medium having a Cr underlayer. At a thickness of 100 nm, the NiAl underlayer offers comparable coercivities and smaller grains than the recording media having a Cr underlayer.

Figure 6:
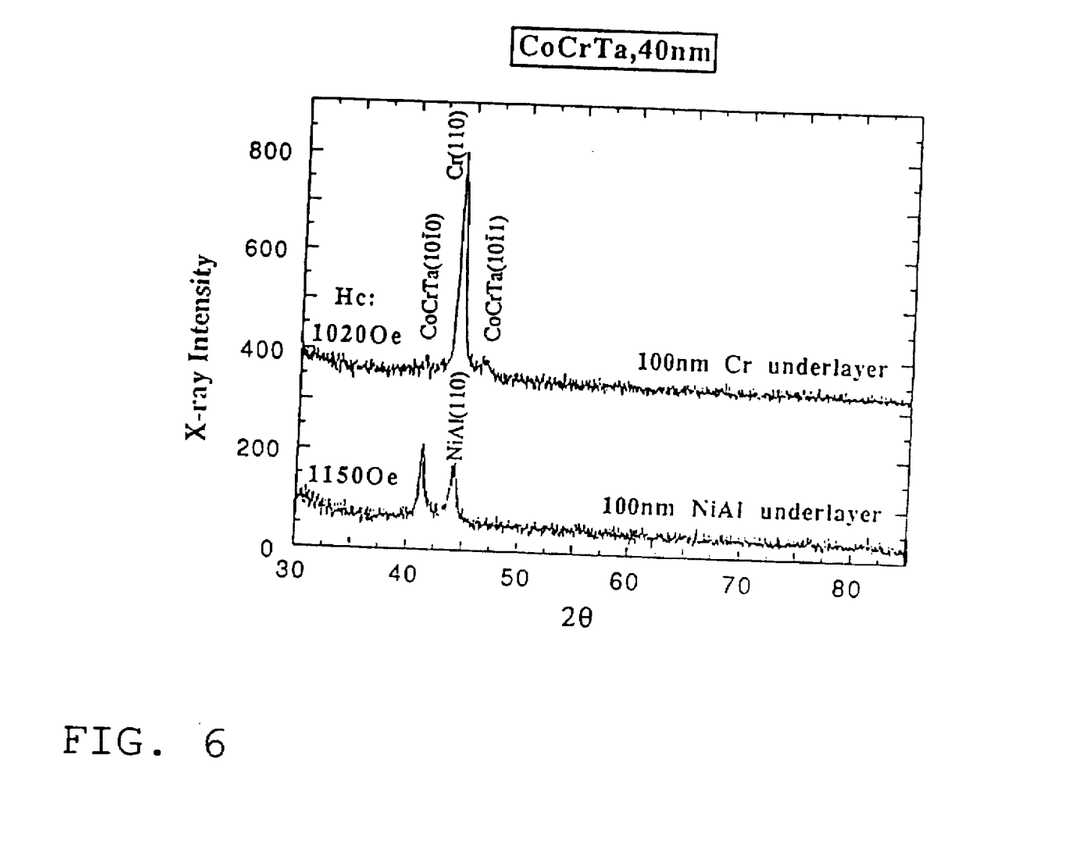
FIG. 6 shows the x-ray diffraction spectra of CoCrTa/Cr and CoCrTa/NiAl films on glass substrates, where the CoCrTa layers are 40 nm thick and the Cr and NiAl underlayers are 100 nm thick.

In addition, the recording medium has a better in-plane c-axis film crystallographic texture when NiAl is used as the underlayer than it does when Cr is the underlayer. The NiAl film has its {110} and {112} planes preferentially oriented parallel to the film plane. This is supported by X-ray diffraction studies which show that the CoCrTa film on the NiAl underlayer has a larger $(10\bar{1}0)_{C_o}$ peak than the CoCrTa film on a Cr underlayer. FIG. 6 provides a comparison of x-ray diffraction spectra of the CoCrTa/NiAl and CoCrTa/Cr films with their Hc values marked on each curve. The NiAl spectrum has a much stronger HCP Co $(10\bar{1}0)$ peak adjacent the NiAl (110) peak which is believed to reflect a (112) NiAl texture which is weak or not present at all in the Cr underlayer.

Figure 7:
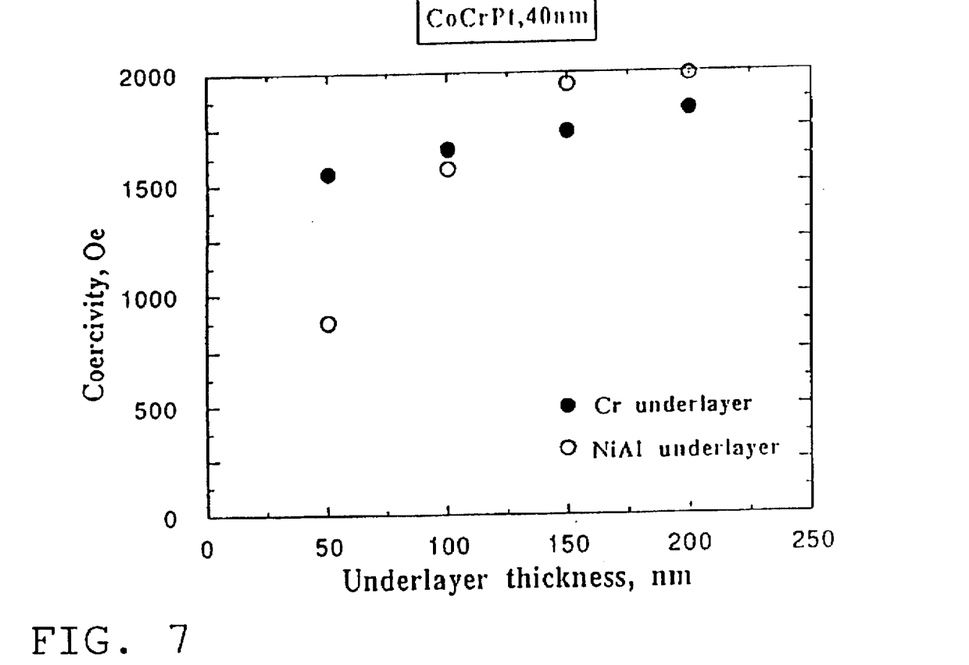
FIG. 7 plots the coercivity of a 40 nm thick CoCrPt film as a function of underlayer thickness for NiAl and Cr underlayers.
Figure 8:
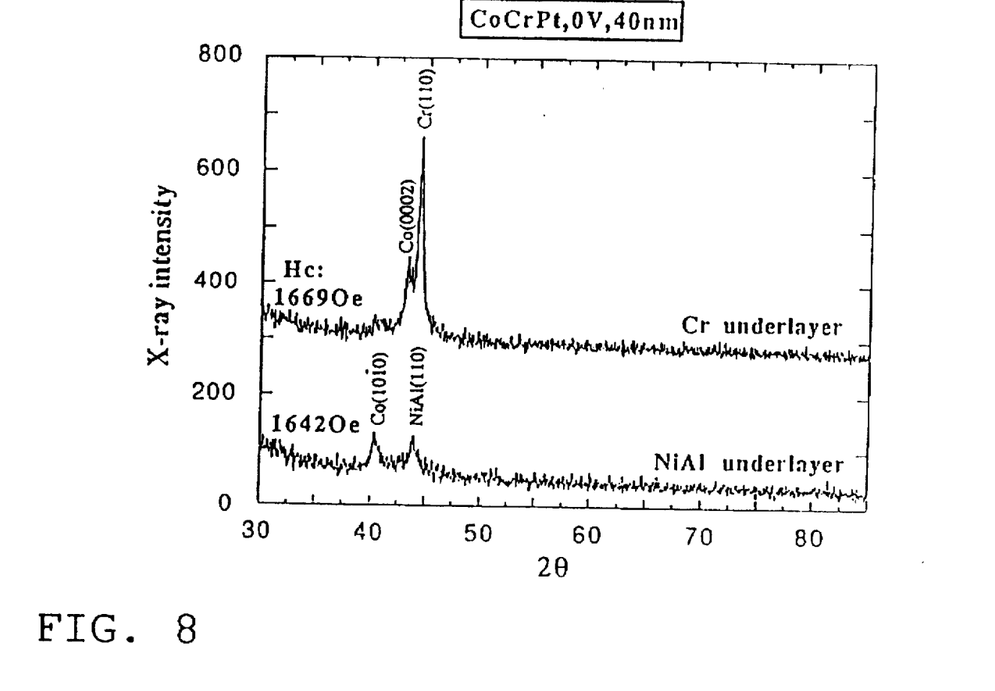
FIG. 8 shows the x-ray diffraction spectra of CoCrPt/Cr and CoCrPt/NiAl films on glass substrates, where the CoCrPt layers are 40 nm thick and all the underlayers are 100 nm thick.
Figure 11:
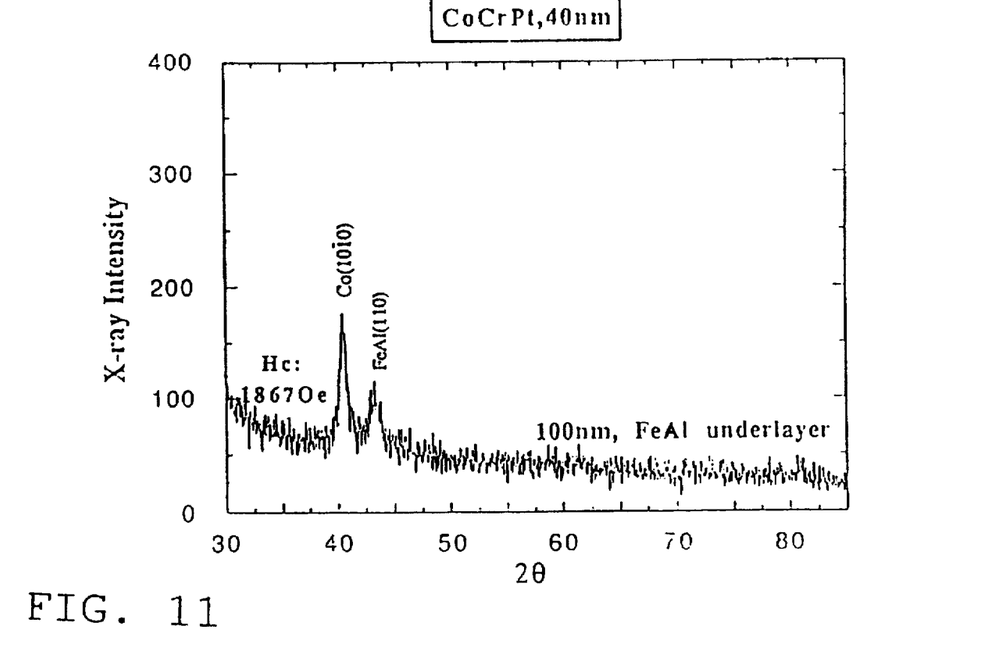
FIG. 11 shows the x-ray diffraction spectrum of a 40nm thick CoCrPt film on a 100 nm thick FeAl underlayer on glass substrate.

Similar studies were performed for CoCrPt films. The in-plane coercivity of a 40 nm CoCrPt film is plotted in FIG. 7 as a function of underlayer thickness for NiAl and Cr underlayers. It shows that for a thicker underlayer, the CoCrPt/NiAl film has a higher coercivity than the CoCrPt/Cr film. FIG. 8 is the x-ray diffraction spectra of CoCrPt/NiAl and CoCrPt/Cr films which show that the CoCrPt film on the NiAl underlayer has a stronger $(10\bar{1}0)_{C_o}$ peak than does the same film on Cr underlayer, which again is an indication of a better in-plane c-axis film crystallographic texture. FIG. 11 demonstrates that another phase with the B2-structure, FeAl, also produces a strong $(10\bar{1}0)_{C_o}$ peak. Pt is added to Co alloys to improve coercivity, but at a 15–20% Pt content, the magnetic layer does not lattice match well with the Cr underlayer. The addition of the larger Pt atom to the Co alloy is believed to expand the atomic spacing so that there is no longer a good lattice match with the Cr underlayer. FIG. 8 also shows a $(0002)_{C_o}$ peak, which reflects a poor epitaxial growth to the Cr underlayer. This phenomenon does not appear to take place when the NiAl is used as the underlayer. The NiAl and FeAl spectra reveal a strong $(10\bar{1}0)_{C_o}$ peak and the absence of the (0002) peak, which is indicative of a good longitudinal structure.

NiAl has not been heretofore used as an underlayer for thin film longitudinal magnetic recording media. The sputter deposited NiAl films have small grain size and enhance the Co alloy films' {10$\bar{1}$0} texture. The underlayers of the present invention enhance the in plane c-axis orientation and therefore improve the magnetic properties of the thin film disk with a glass substrate. Similar improvements can be found when other substrates, such as aluminum alloy substrates coated with NiP or silicon substrates are used. Similar results on alternative hard disk substrates such as canasite, or SiC should be obtained also. The underlayer of the present invention may be used as the underlayer for other Co alloy thin films, such as CoCr, SmCo, CoP, CoPt, CoNiCr, CoNiPt, CoCrTaSi, CoCrPtSi, CoCrPtB, and CoCrPtTa.

Figure 9:
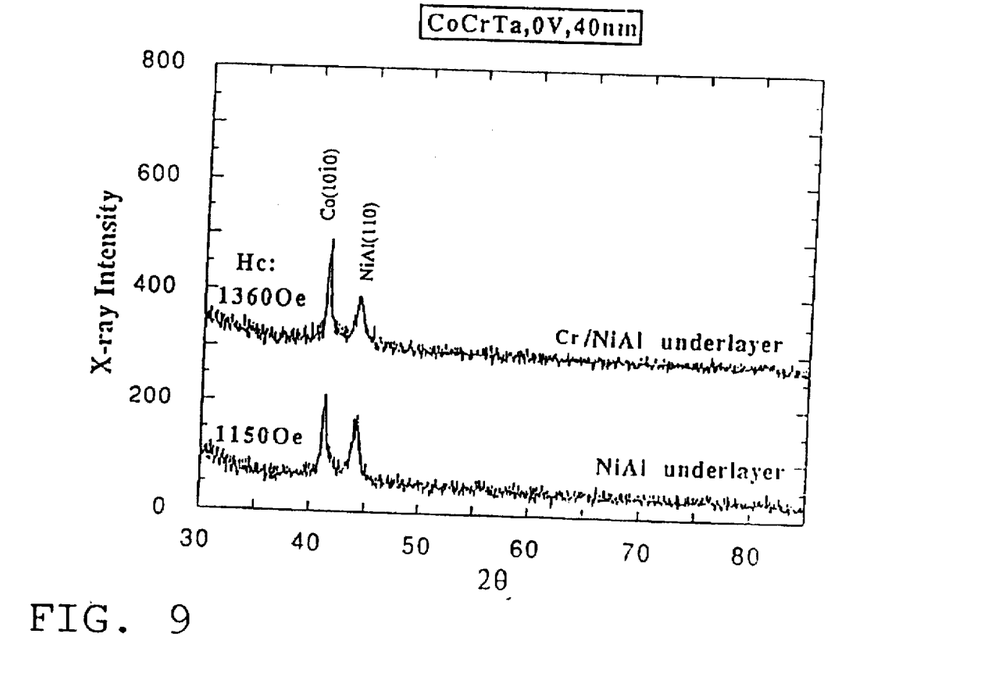
FIG. 9 shows the x-ray diffraction spectra of a CoCrTa/NiAl film with and without a 2.5 nm thick Cr intermediate layer between the CoCrTa layer and the NiAl layer.

Further improvement in the magnetic properties of the Co alloy thin films on NiAl underlayers can be attained if an intermediate layer of Cr is inserted between the Co alloy thin film and the NiAl underlayer. Furthermore, the underlying NiAl texture is transmitted to the intermediate Cr layer. FIG. 9 shows the x-ray spectra of a CoCrTa/NiAl film with and without a 2.5 nm Cr intermediate layer between the CoCrTa layer and the NiAl layers. From FIG. 9 it is apparent that when a very thin layer of Cr is placed between NiAl and CoCrTa, the high quality texture of the Co ($10\bar{1}0$) is maintained and the coercivity is improved. It is believed that the increase in coercivity may be due to diffusion of Cr from the intermediate layer to grain boundaries of the CoCrTa. It has been found that an intermediate layer 22 of Cr having a thickness less than about 1.0 nm does not form a continuous layer. A substantially continuous layer is apparently needed to give consistent results. At 1.0 nm to 5.0 nm thickness and above, however, the improved coercivity is marked and consistent. Thicknesses above 5.0 nm continue to provide good coercivity, but produce no significant improvement. Surprisingly, the combination of a CoCrPt magnetic layer, a NiAl underlayer and a very thin (about 2.5 nm) Cr intermediate layer disposed between the magnetic layer and the underlayer increases the coercivity even more significantly, by 450 Oe. If the cobalt alloy magnetic layer has only the 2.5 nm thick Cr layer without the NiAl underlayer, the Co layer tends to remain either face centered cubic (FCC) or orients (0002) perpendicular to the plane of the film.

Figure 10:
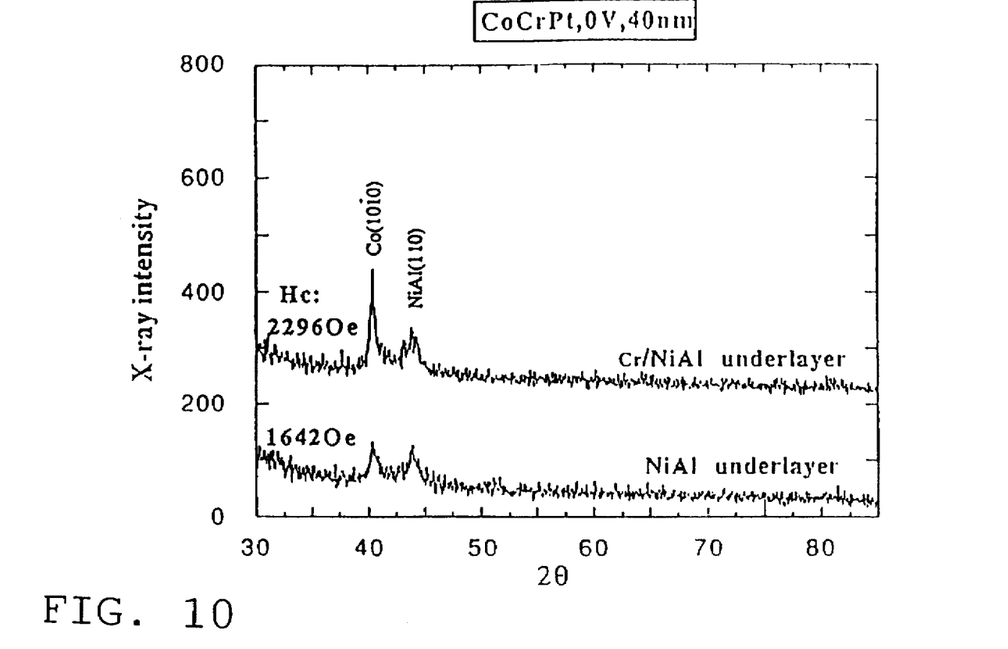
FIG. 10 shows the x-ray diffraction spectra of a CoCrPt/NiAl film with and without a 2.5 nm thick Cr intermediate layer between the CoCrPt layer and the NiAl layer.
Figure 12:
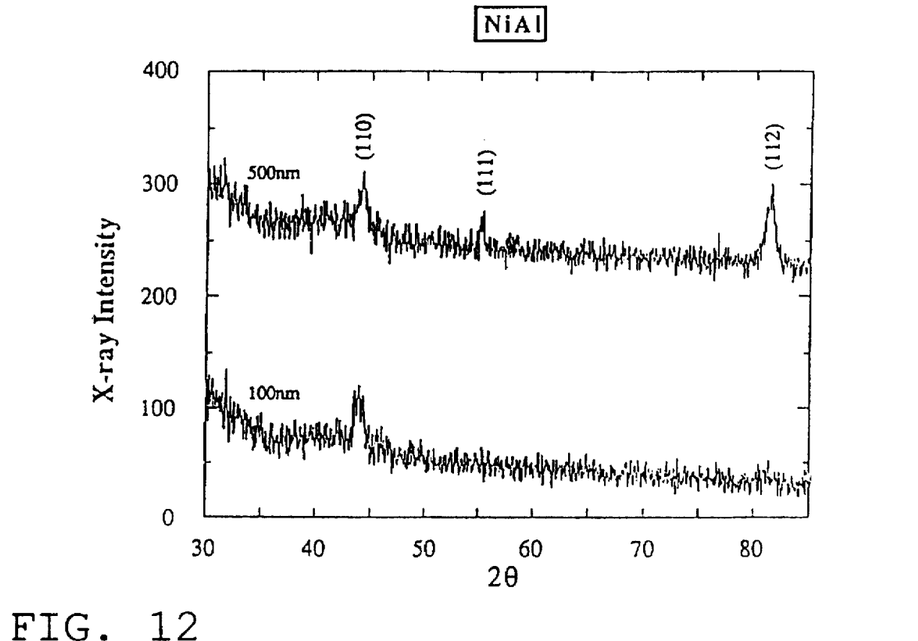
FIG. 12 shows the x-ray diffraction spectra of NiAl films of 100 nm and 500 nm thickness on glass substrates.
Figure 13:
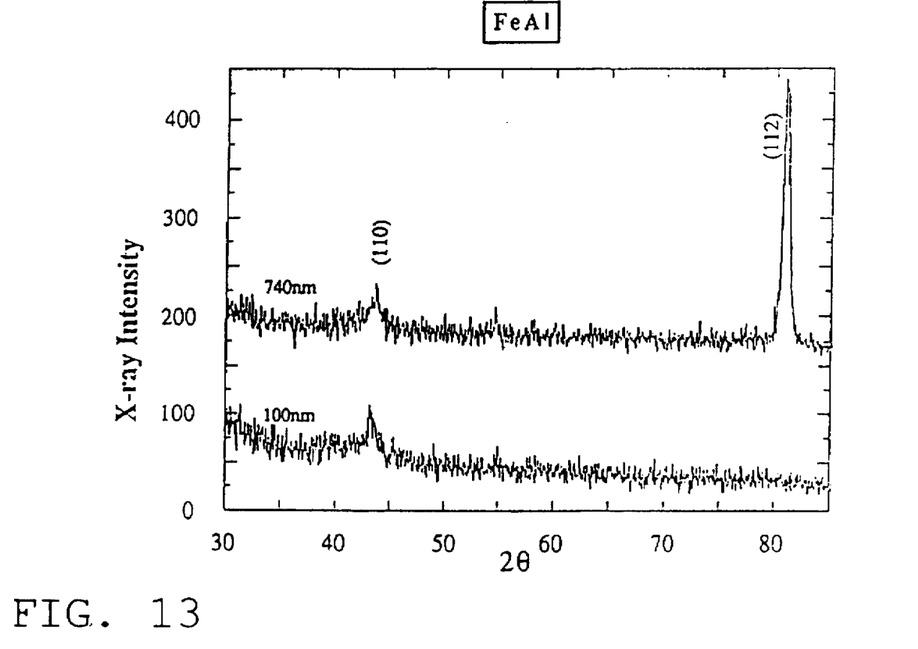
FIG. 13 shows the x-ray diffraction spectra of FeAl films of 100 nm and 740 nm thickness on glass substrates.

FIG. 10 shows the x-ray spectra of a CoCrPt/NiAl film with and without a 2.5 nm Cr intermediate layer between the CoCrPt layer and the NiAl layer. The increase in coercivity is even more dramatic than the increase shown in FIG. 9 using a CoCrTa magnetic layer. The lattice constant of the cobalt HCP structure is significantly increased when the larger Pt atom is substituted for Co. Hence a poorer lattice match between the CoCrPt and the underlayer results. This is obvious in FIG. 8 where CoCrPt on Cr showed no Co ($10\bar{1}0$) peak at all. This peak does occur for the NiAl underlayer, however. It is believed that the difference can be attributed to the ability of NiAl to form a better (112) texture than Cr. Although it is not visible the x-ray diffraction patterns, this peak should show up at $2\theta=81.86$ degree. Thicker films show this peak as shown in FIGS. 12 and 13 for the NiAl and FeAl underlayers. The (112) texture represents a good lattice match to the Co($10\bar{1}0$) texture. Furthermore, by comparing FIGS. 8 and 10, the dramatic difference between CoCrPt on a Cr underlayer (no ($10\bar{1}0$) peak and a lower coercivity) and CoCrPt on NiAl with a thin intermediate layer is apparent.

Figure 14:
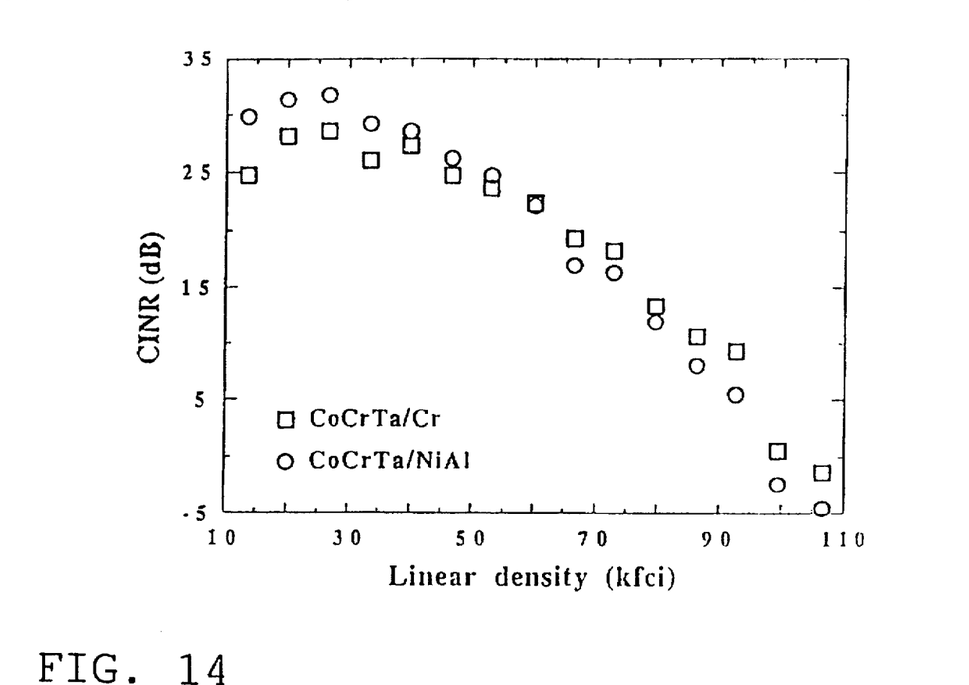
FIG. 14 plots carrier to total integrated noise ratio (CINR) as a function of the linear density for two disks, CoCrTa/Cr and CoCrTa/NiAl, with bias sputtered magnetic layers and unbiased sputtered underlayers.

Tests were done to compare the carrier to total integrated noise ratio (CINR) as a function of the linear recording density, measured in kilo flux changes per inch (KFCI) for two disks. Procedures for taking total integrated noise data are well known to those skilled in the art. See, for example, Belk et al., "Measurement of intrinsic signal-to-noise ratio for high-performance rigid recording media," Journal of Applied Physics, Vol. 59, No. 2, p. 557 (15 Jan. 1986). The results are plotted in FIG. 14. The underlayers were sputter deposited on a glass substrate without bias and the magnetic layer was sputter deposited with bias, i.e. with an applied voltage to the surface. The disk represented by squares was CoCrTa/Cr having a coercivity of 1700 Oe. The disk represented by circles was CoCrTa/NiAl having a coercivity of 1400 Oe. The disks having NiAl as the underlayer were determined to behave comparably to the disks having Cr as the underlayer, but the coercivities were somewhat lower in this sample for NiAl films when the magnetic layer is deposited with bias. The noise levels were also somewhat lower.

Figure 15:
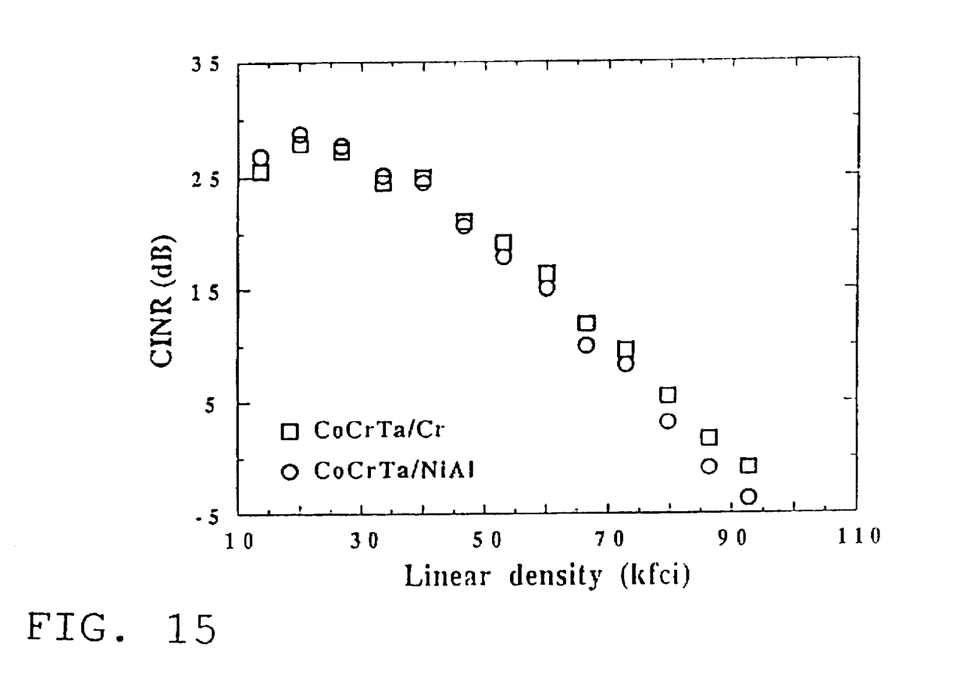
FIG. 15 plots the carrier to total integrated noise ratio (CINR) as a function of linear density for two disks, CoCrTa/Cr and CoCrTa/NiAl, with unbiased sputtered magnetic and underlayers.

In order to compare recordings on media with similar coercivities but different underlayers, disks were sputtered without bias. Tests were done to compare the carrier to total integrated noise (CINR) between the two disks. The results are shown in FIG. 15. The disk represented by the squares had a CoCrTa magnetic layer on a Cr underlayer and a coercivity of 1000 Oe. The disk represented by circles had a CoCrTa magnetic layer and a NiAl underlayer and a coercivity of 1150 Oe. Again, the behavior of the two disks was comparable with the NiAl disk showing lower noise somewhat.

Figure 16:
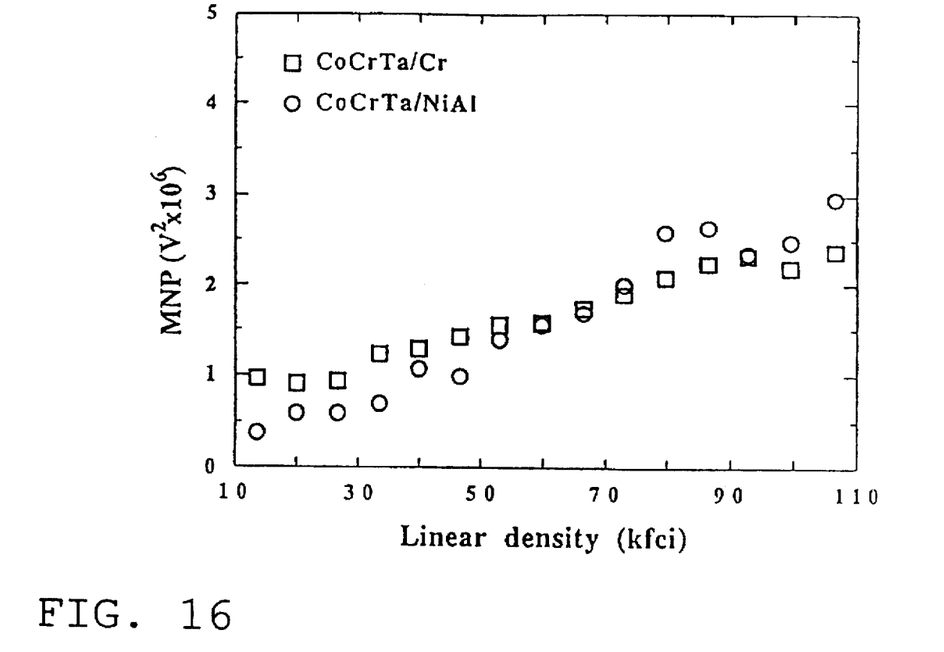
FIG. 16 plots the total medium integrated noise power (MNP) as a function of linear density for the two disks of FIG. 14; and, FIG. 17 plots the total medium integrated noise power (MNP) as a function of linear density for the two disks of FIG. 15.
Figure 17:
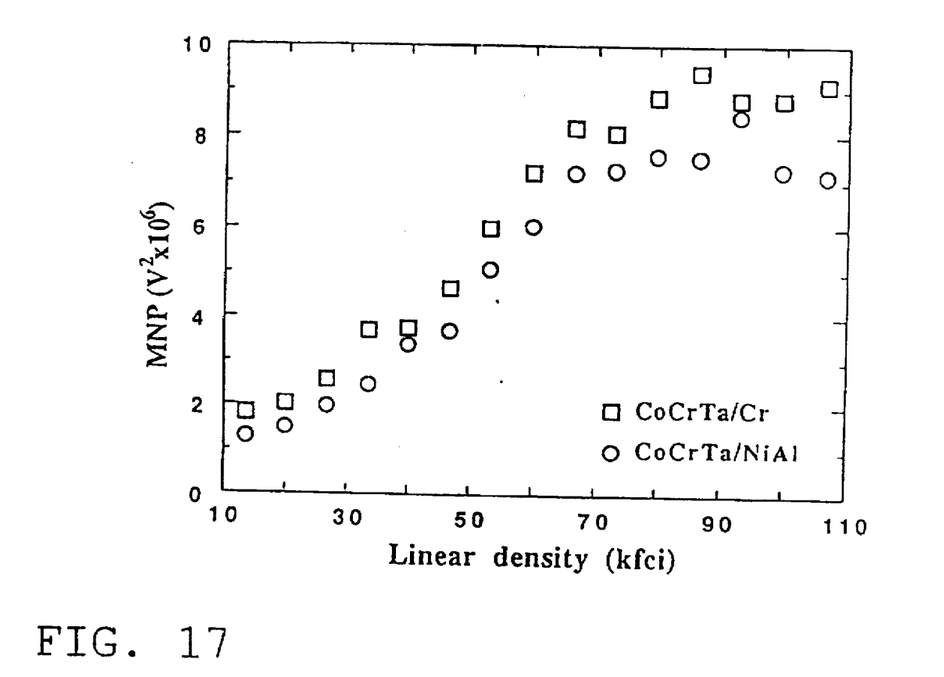

FIG. 16 plots the medium integrated noise power (MNP) as a function of linear density. The MNP represents the total integrated noise power divided by the voltage pulse one would obtain if the signal were recorded at low frequencies (i.e., the isolated pulse height). FIG. 16 shows the results for the disks of FIG. 14. FIG. 17 plots the MNP as a function of linear density for the disks of FIG. 15. The results for the disks in FIGS. 16 and 17 are comparable, with lower noise for the disk having the NiAl underlayer, particularly when the magnetic layer are not deposited with bias. The results demonstrate that the disposition of the NiAl underlayer between the substrate and the magnetic layer is at least as valuable, if not more so, to the enhanced behavior of the recording media than the similar disposition of a Cr underlayer. It is anticipated that thin film longitudinal magnetic recording media having NiAl underlayers, or other B2 ordered structures as underlayers, will, with minor optimization, perform even better than the comparable products with Cr underlayers.

What is claimed:

1. A magnetic recording medium comprising:
   a substrate;
   a Co or Co alloy film forming a magnetic layer; and,
   an underlayer comprised of a material having a B2-ordered crystalline structure disposed between said substrate and said film.

2. The recording medium recited in claim 1 wherein said material is NiAl.

3. The recording medium recited in claim 1 wherein said material is FeAl.

4. The recording medium recited in claim 1 wherein said material is selected from the group consisting of NiAl, AlCo, FeAl, FeTi, CoFe, CoTi, CoHf, CoZr, NiTi, CuBe, CuZn, AlMn, AlRe, AgMg and Al$_2$FeMn$_2$.

5. The recording medium recited in claim 4 wherein said underlayer is comprised of multiple layers of two or more of said materials with the B2 structure.

6. The recording medium recited in claim 1 further comprising a chromium intermediate layer interposed between said film and said underlayer.

7. The recording medium recited in claim 1 further comprising an overcoat disposed on said film, such that said film lies between said underlayer and said overcoat.

8. The recording medium recited in claim 7 further comprising an organic lubricant disposed on said overcoat such that said overcoat lies between said lubricant and said magnetic layer.

9. The recording medium recited in claim 8 further comprising an overlayer disposed on said magnetic layer such that said overlayer lies between said magnetic layer and said overcoat.

10. The recording medium recited in claim 1 wherein said magnetic layer has an epitaxial crystalline structure grown from said underlayer.

11. The recording medium recited in claim 1 further comprising an intermediate layer interposed between said magnetic layer and said underlayer to promote epitaxial crystalline growth of said magnetic layer.

12. In a magnetic recording medium having a substrate, an underlayer and a magnetic layer, the improvement comprising:

said underlayer is comprised of a material having a B2-ordered crystalline structure disposed between substrate and said magnetic layer.

13. The improvement recited in claim 12 wherein said material is selected from the group consisting of NiAl, AlCo, FeAl, FeTi, CoFe, CoTi, CoHf, CoZr, NiTi, CuBe, CuZn, AlMn, AlRe, AgMg and $Al_2FeMn_2$.

14. The improvement recited in claim 13 further comprising a chromium intermediate layer interposed between said magnetic layer and said underlayer.

15. The improvement recited in claim 14 wherein said intermediate layer is sufficiently thick to substantially cover said underlayer.

16. The improvement recited in claim 14 wherein said intermediate layer is about 1.0 nm to about 5.0 nm thick.

17. The improvement recited in claim 12 wherein said underlayer has a lattice constant ranging from 0.27 nm to 0.33 nm.

18. A magnetic recording medium comprising:

a substrate;

a Co or Co alloy film forming a magnetic layer; and, an underlayer comprised of NiAl having a B2-ordered crystalline structure disposed between said substrate and said film.

19. A magnetic recording medium comprising:

a substrate;

a Co or Co alloy film forming a magnetic layer; and, an underlayer comprised of FeAl having a B2-ordered crystalline structure disposed between said substrate and said film.

20. A magnetic recording medium comprising:

a substrate;

a Co or Co alloy film forming a magnetic layer; and an underlayer between about 10 to 200 nm thick comprised of a material having a B2-ordered crystalline structure disposed between said substrate and said film.

21. In a magnetic recording medium having a substrate, an underlayer and a magnetic layer, the improvement comprising;

said underlayer is comprised of a material having a B2-ordered crystalline structure between about 10 to 200 nm thick disposed between said substrate and said magnetic layer.

22. An apparatus for data storage comprising:

a hard disk comprising, a substrate forming the disk, a Co or Co alloy film forming a magnetic layer, and, an underlayer comprised of material having a B2-ordered crystalline structure disposed between said substrate and said film; and, a magnetic transducer positioned in close proximity to said disk to record and read data to and from said disk.

23. The apparatus recited in claim 22 wherein said hard disk further comprises an intermediate layer interposed between said magnetic layer and said underlayer to promote epitaxial growth of said magnetic layer.

24. The apparatus recited in claim 23 wherein said intermediate layer comprises a chromium or chromium vanadium intermediate layer.

25. The apparatus recited in claim 22 wherein said magnetic layer has an epitaxial crystalline structure grown from said underlayer.

26. A method of producing an epitaxial crystalline Co or Co alloy magnetic layer on a recording substrate, said method comprising:

depositing material having a B2 structure on the substrate; and, growing the Co or Co alloy magnetic layer on the B2 structure.

27. The method of claim 26, wherein said step of depositing further comprises depositing material having a B2 structure and a lattice structure which promotes epitaxial crystalline growth of the magnetic layer.

28. The method of claim 26, wherein said step of depositing further comprises depositing material having a B2 structure and a lattice constant comparable to that of the magnetic layer.

29. The method of claim 26, further comprising the step of interposing an intermediate layer between the underlayer and the magnetic layer to promote epitaxial crystalline growth of the magnetic layer.

30. The method of claim 29, wherein:

said step of depositing further comprises depositing a NiAl or FeAl underlayer; and, said step of inteposing further comprises interposing a Cr intermediate layer.

* * * * *

UNITED STATES PATENT AND TRADEMARK OFFICE
CERTIFICATE OF CORRECTION

PATENT NO. : 5,693,426
DATED : Dec. 2, 1997
INVENTOR(S) : Lee et al.

It is certified that error appears in the above-identified patent and that said Letters Patent is hereby corrected as shown below:

Column 2, line 13, after the term "the", insert --HCP--;

Column 2, line 42, after the term "to", insert --the--;

Column 9, line 61, before the term "structure", insert --the--;

Column 5, line 10, delete "$CF_3CF_2)_4$" and substitute therefor --$CF_3(CF_2)_4$--;

Column 7, line 44, after "visible", insert --on--.

Signed and Sealed this

Twenty-ninth Day of May, 2001

*Attest:*

NICHOLAS P. GODICI

*Attesting Officer*   Acting Director of the United States Patent and Trademark Office